United States Patent
McBroom et al.

(10) Patent No.: US 7,934,780 B2
(45) Date of Patent: May 3, 2011

(54) MAGNETIC RELEASE LATCH MECHANISM FOR A DEVICE

(75) Inventors: Michael David McBroom, Celeste, TX (US); Brian Thomas Sudderth, Leonard, TX (US); Daniel Lynn McBroom, Leonard, TX (US); John Ternus, Palo Alto, CA (US)

(73) Assignee: Apple Inc., Cupertino, CA (US)

( * ) Notice: Subject to any disclaimer, the term of this patent is extended or adjusted under 35 U.S.C. 154(b) by 868 days.

(21) Appl. No.: 11/327,753

(22) Filed: Jan. 6, 2006

(65) Prior Publication Data

US 2007/0159033 A1    Jul. 12, 2007

(51) Int. Cl.
A47B 97/00 (2006.01)
A47B 81/00 (2006.01)
E05C 7/06 (2006.01)

(52) U.S. Cl. .................. 312/223.2; 312/222
(58) Field of Classification Search ............... 312/223.2, 312/222; 292/251.5
See application file for complete search history.

(56) References Cited

U.S. PATENT DOCUMENTS

| | | | | |
|---|---|---|---|---|
| 2,730,392 A * | 1/1956 | Thiebaud | 292/201 |
| 3,831,986 A * | 8/1974 | Kobayashi | 292/201 |
| 3,837,525 A * | 9/1974 | Kobayashi | 220/326 |
| 4,919,464 A * | 4/1990 | Richards | 292/251.5 |
| 4,964,661 A * | 10/1990 | Cadwell et al. | 292/87 |
| 5,035,451 A * | 7/1991 | Brady | 292/96 |
| 5,188,405 A * | 2/1993 | Maccaferri | 292/204 |
| 5,348,356 A * | 9/1994 | Moulton | 292/80 |
| 5,485,733 A * | 1/1996 | Hoffman | 70/276 |
| 5,608,980 A * | 3/1997 | Pangerl | 40/793 |
| 5,611,579 A * | 3/1997 | Kreitenberg | 292/130 |
| 6,669,092 B2 * | 12/2003 | Leanheart et al. | 235/462.13 |
| 7,438,333 B2 * | 10/2008 | Wu et al. | 292/251.5 |
| 2005/0023841 A1 * | 2/2005 | Chen | 292/251.5 |

* cited by examiner

Primary Examiner — Darnell M Jayne
Assistant Examiner — Timothy M Ayres
(74) Attorney, Agent, or Firm — Beyer Law Group LLP

(57) ABSTRACT

A latching mechanism for a device is disclosed. The device includes a first member and a second member. The latching mechanism comprises one or more protruding members coupled to an interior of the device. The one or more protruding members is coupled to one of the first member and the second member. The latching mechanism includes one or more latches coupled to an interior portion of the device. The one or more latches are coupled to the other of the first and second members. The one or more latches is engageably coupled to the one or more protruding members when the first and second are coupled together. The one or more latches can be released from the one or more protruding members through the use of a magnet.

20 Claims, 7 Drawing Sheets

MAGNETIC RELEASE LATCH MECHANISM FOR A DEVICE

FIELD OF THE INVENTION

The present invention relates to a device and more specifically to latching mechanism for opening and closing such a device.

BACKGROUND OF THE INVENTION

In contemporary computers such as iMac computers manufactured by Apple Computer, Inc. of Cupertino, Calif., most of the critical components, such as the motherboard, memory, etc., are enclosed within a small interior space. Modification, upgrading and repair of such a computer requires access to the components within this interior space, which is enclosed on all sides. In the case of the iMac computer, for example, the interior components are accessed by means of case screws. A Phillips screwdriver or a tool provided by the computer manufacturer is needed in order to turn these screws, and they must be turned in and then not removed, in accordance with the manufacturer's instructions. Once the screws have been turned in accordance with the manufacturer's instructions, the case of the computer can then be opened to access the interior components.

Other computers may require a different tool to open the case, and there may be different manufacturers' instructions, but in each instance a specific tool is required to open the case and manufacturer's instructions must be followed. If the customer or repair person does not have the correct tool, uses too much force, or does not otherwise follow the manufacturer's instructions, the case of the computer may be damaged or may not be possible to open. Also, such tools, which could include different kinds of screwdrivers, keys, or custom tools, are easily lost or misplaced, in which case a replacement tool must be ordered, further causing a delay in repair or upgrading of the computer.

Accordingly, what is needed is a method and system for opening a device easily and quickly, without the possibility of damage to the computer, display, or device. The method and system should be easily implemented, adaptable and cost-effective. The present invention addresses such a need.

SUMMARY OF THE INVENTION

A latching mechanism for a device is disclosed. The device includes a first member and a second member. The latching mechanism comprises one or more protruding members coupled to an interior of the device. The one or more protruding members is coupled to one of the first member and the second member. The latching mechanism includes one or more latches coupled to an interior portion of the device. The one or more latches are coupled to the other of the first and second members. The one or more latches is engageably coupled to the one or more protruding members when the first and second are coupled together. The one or more latches can be released from the one or more protruding members through the use of a magnet.

DETAILED DESCRIPTION

The present invention relates to computers and more specifically to a method for opening the case of a computer. The following description is presented to enable one of ordinary skill in the art to make and use the invention and is provided in the context of a patent application and its requirements. Various modifications to the preferred embodiments and the generic principles and features described herein will be readily apparent to those skilled in the art. Thus, the present invention is not intended to be limited to the embodiments shown, but is to be accorded the widest scope consistent with the principles and features described herein.

Figure 1A:
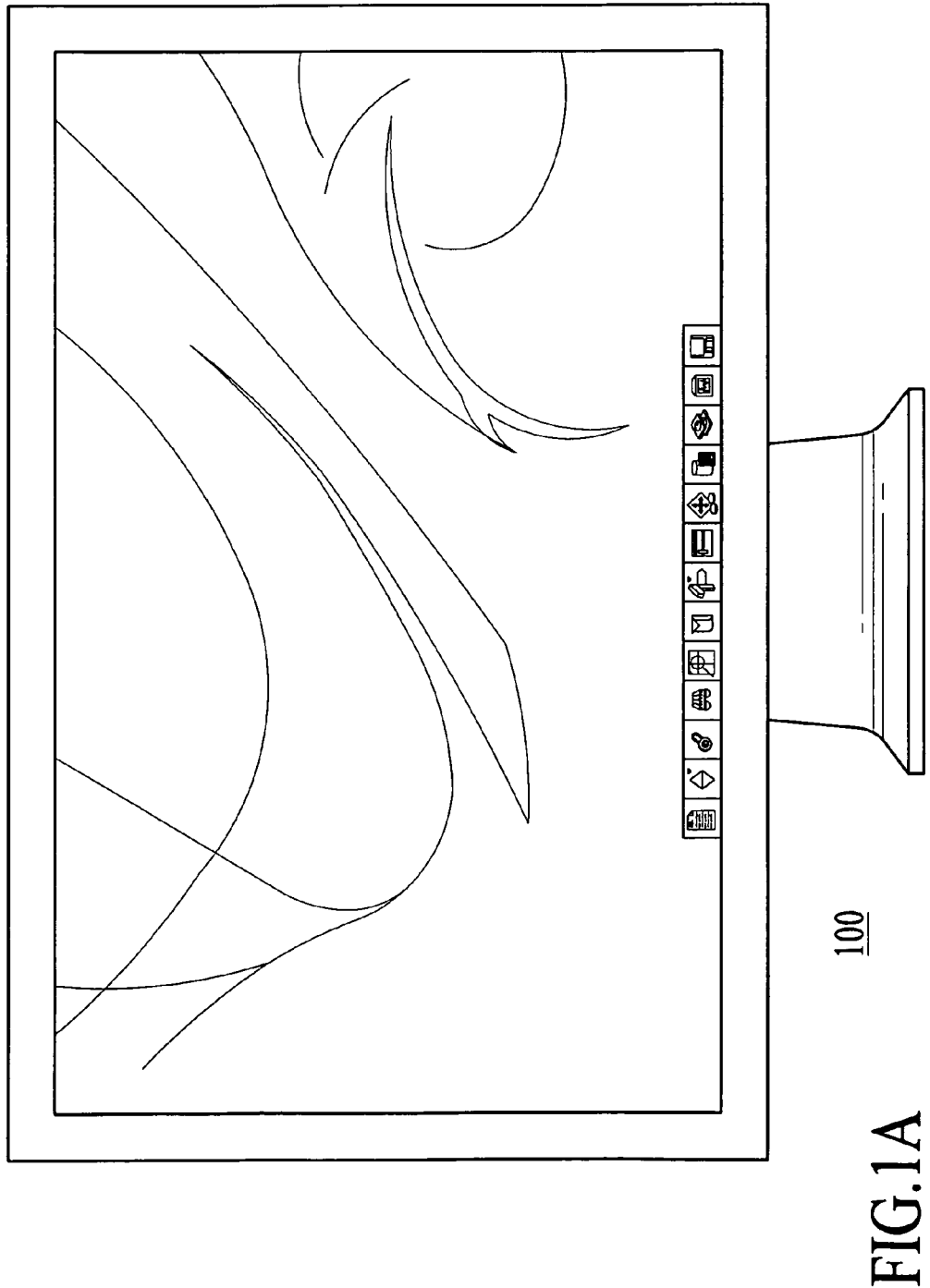
FIGS. 1A and 1B are front and side perspective views of an embodiment of a conventional computer.
Figure 1B:
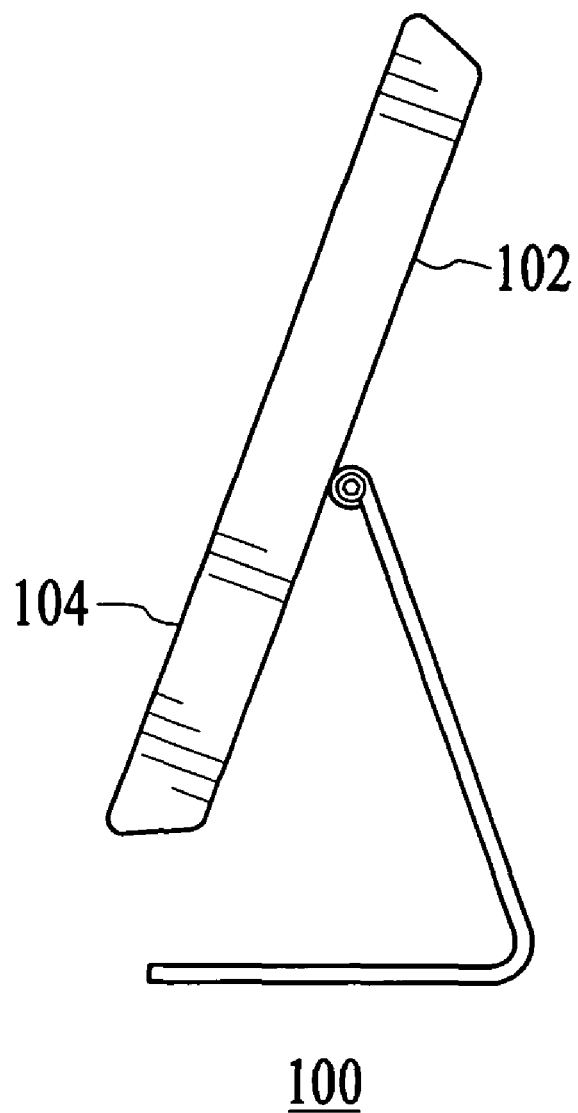

FIGS. 1A and 1B are front and side perspective views of an embodiment of a conventional computer 100. In this embodiment the computer 100 is, for example, an iMAC computer manufactured by Apple Computer, Inc. As before mentioned, this type of computer 100 includes components therewithin. Accordingly the interior compartments must be accessed by removing a rear cover 102 from a bezel 104 of the computer 100. As before mentioned, these components are conventionally accessed by placing fasteners exterior to the computer 100 such as screws to secure the rear cover 102. Typically a screwdriver is utilized to secure and remove the rear cover 102 to the computer 100.

A system and method in accordance with the present invention provides for a latching system which is internal to the device for coupling together the members which house the interior components of the device. The latching system includes at least one latching mechanism which can be released through the use of a magnet exterior to the device thereby allowing for the decoupling of the members which house the interior components. In so doing, a tool such as a screwdriver or the like is not required to decouple the members.

To describe the features of the present invention in the context of a specific embodiment and its accompanying figures, refer now to the following. Although the present invention is described in relation to a particular type of computer, one of ordinary skill in the art readily recognizes that a system and method in accordance with the present invention can be utilized in a variety of devices and environments and that use would be within the spirit and scope of the present invention.

Figure 2:
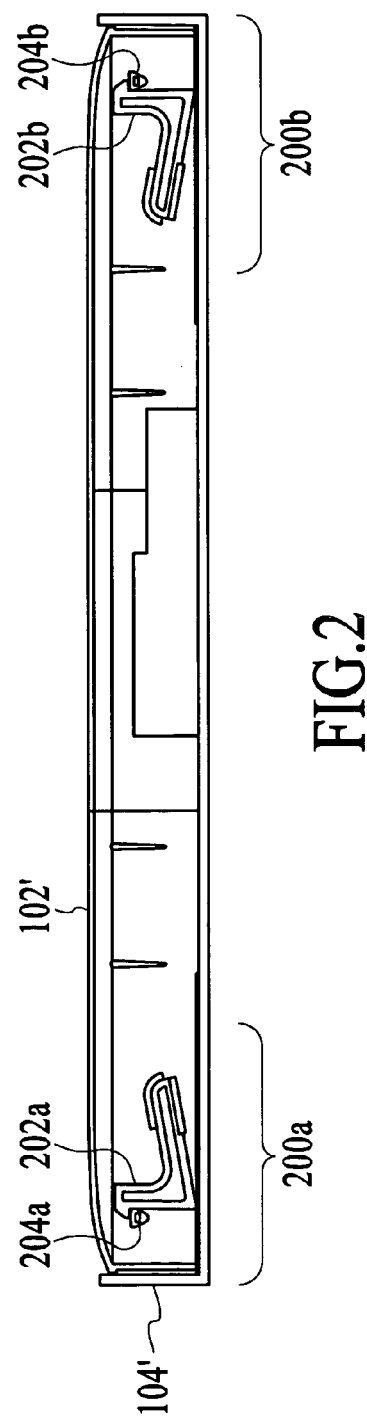
FIG. 2 is a cut-away cross-sectional view of an embodiment of a computer with an internal latching system in accordance with the present invention.

FIG. 2 is a cut-away cross-sectional view of an embodiment of a computer 100' with an internal latching system in accordance with the present invention. In this embodiment the latching system comprises two internal latching mechanisms 200a and 200b. Although two latching mechanisms are illustrated in this embodiment one of ordinary skill in the art readily recognizes that there can be any number of the latching mechanisms and there use would be within the spirit and scope of the present invention.

Each of the latching mechanisms 200a and 200b comprises a latch 202a, 202b which is engage with its respective protruding member 204a, 204b. In this embodiment the latches 202a and 202b are coupled to the bezel 104' and the protruding or boss members 204a and 204b are coupled to the rear member 102. Although the latches and boss members are coupled to the bezel and rear cover respectively in this embodiment one of ordinary skill in the art readily recognizes that the coupling could be reversed or varied and there use would be within the spirit and scope of the present invention. Furthermore it is readily understood by one of ordinary skill in the art that a variety of enclosures could be utilized to that have more than one member coupled together and there use would be within the spirit and scope of the present invention. Latches 202 and 202b include a metal that is attracted to a magnetic force. The latches in a preferred embodiment are made of steel like material. This is utilized to advantage to allow the rear cover to be disengaged from the bezel 104 without the use of external fasteners. To illustrate this feature refer now to FIG. 2A.

Figure 2A:
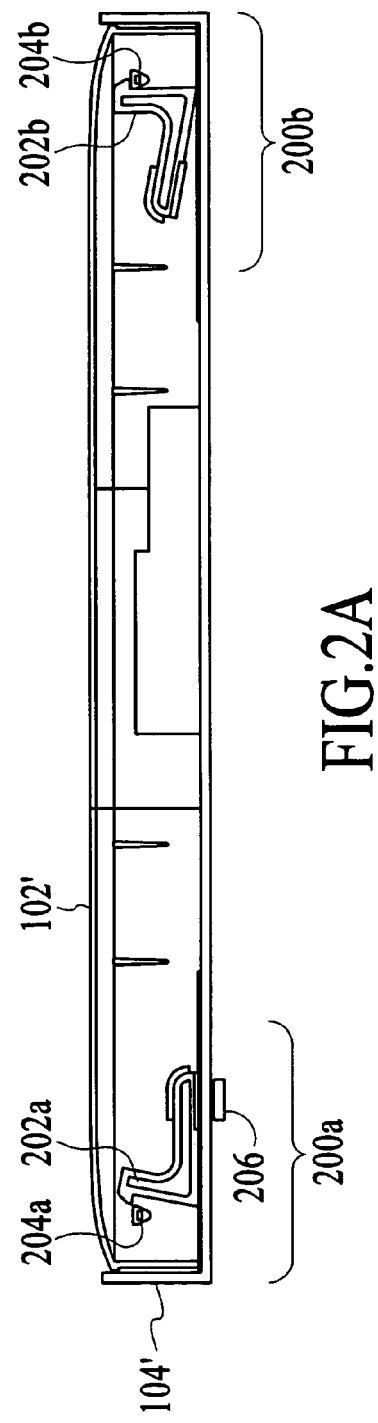
FIG. 2A illustrates the same view of the latching system of FIG. 2 except that the latching mechanism is disengaged.

FIG. 2A illustrates the same view of the latching system of FIG. 2 except that the latching mechanism 200a is disengaged. By placing a magnet 206 exterior to the computer 100 the latch 202a is released from the boss member 204a allowing for the rear cover 102 and the bezel 104 to be disengaged.

Figure 3:
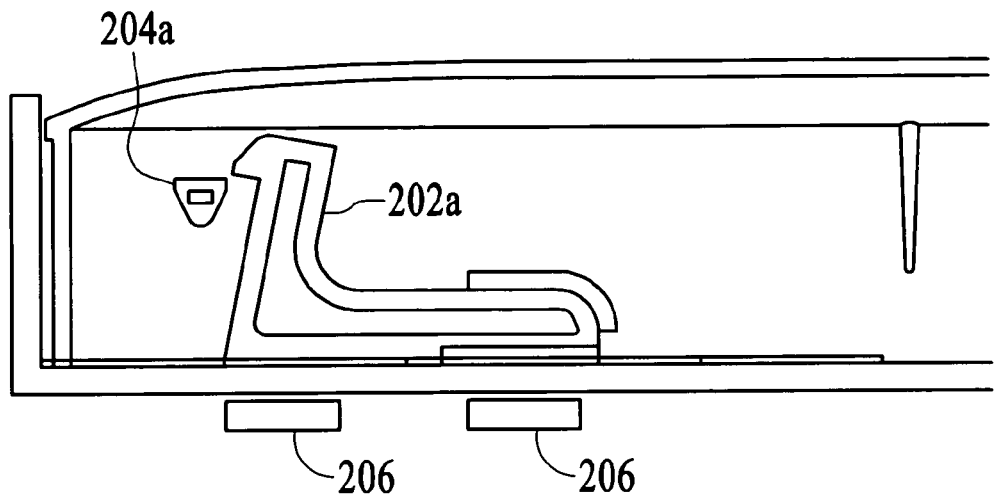
FIG. 3 is a blown up view of the latch shown of FIG. 2A.

FIG. 3 is a blown up view of the latch 202a shown of FIG. 2A. As is seen the magnet 206 has pulled the latch 202a downward, causing the latch 202a to disengage from the boss member 204a.

Figure 4:
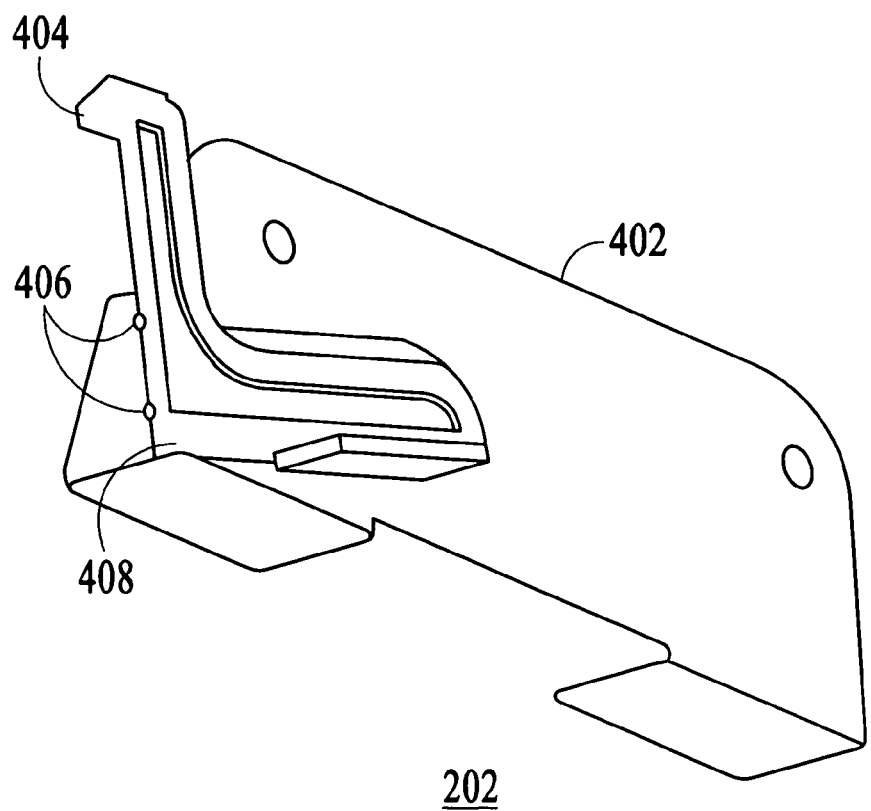
FIG. 4 is a perspective view of an embodiment of the latch in accordance with the present invention.

FIG. 4 is a perspective view of an embodiment of the latch 202 in accordance with the present invention. The latch 202 includes a body portion 402 which is coupled to the bezel 102. The latch 202 includes a latch portion 404 coupled to the body portion 402 and a hinge 406 which allows for the up and down movement of the latch portion. There is also a space 408 between the latch 202 and the body portion 402 for allowing the rear cover to be placed therebetween.

Figure 5:
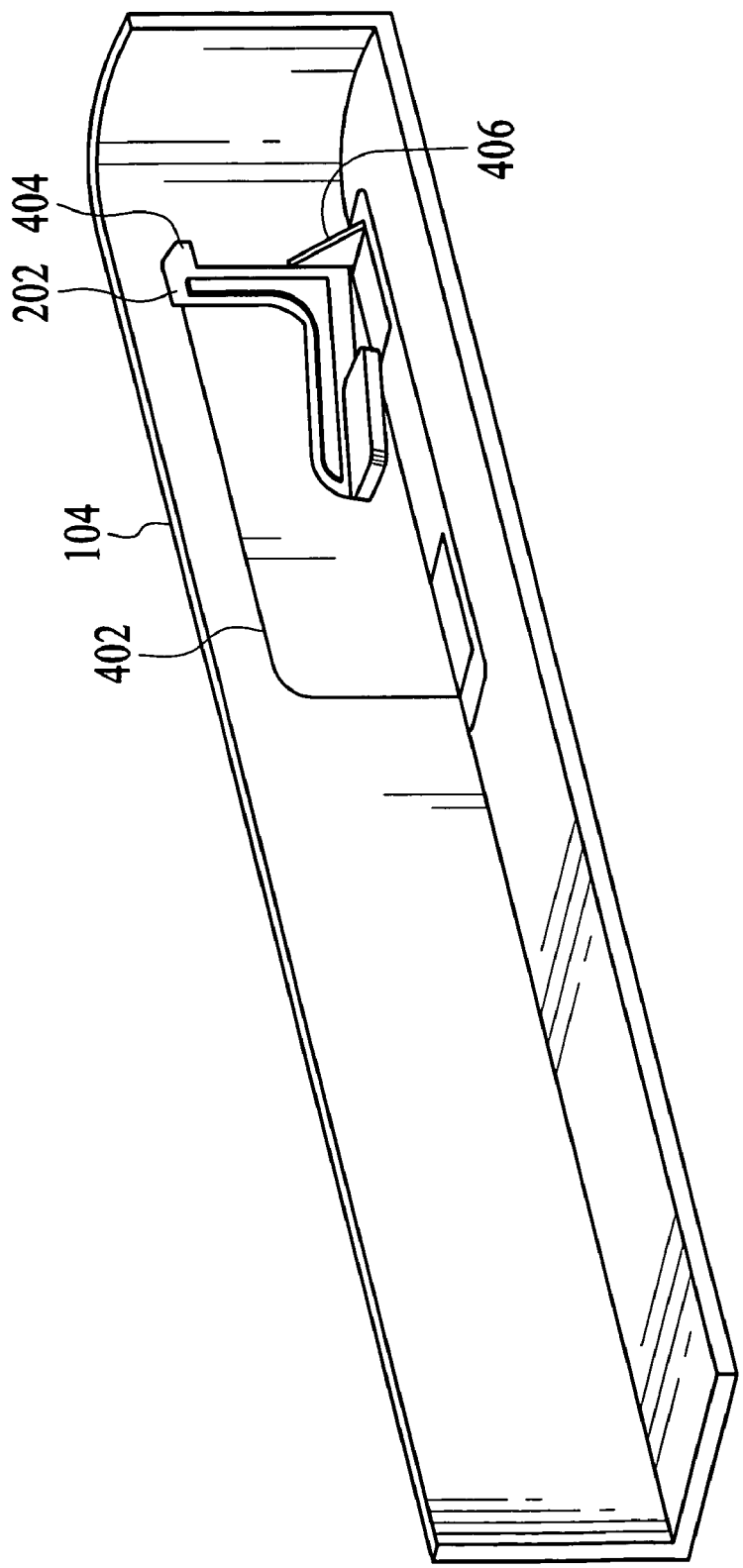
FIG. 5 is a perspective view of the bezel in accordance with the present invention.
Figure 6:
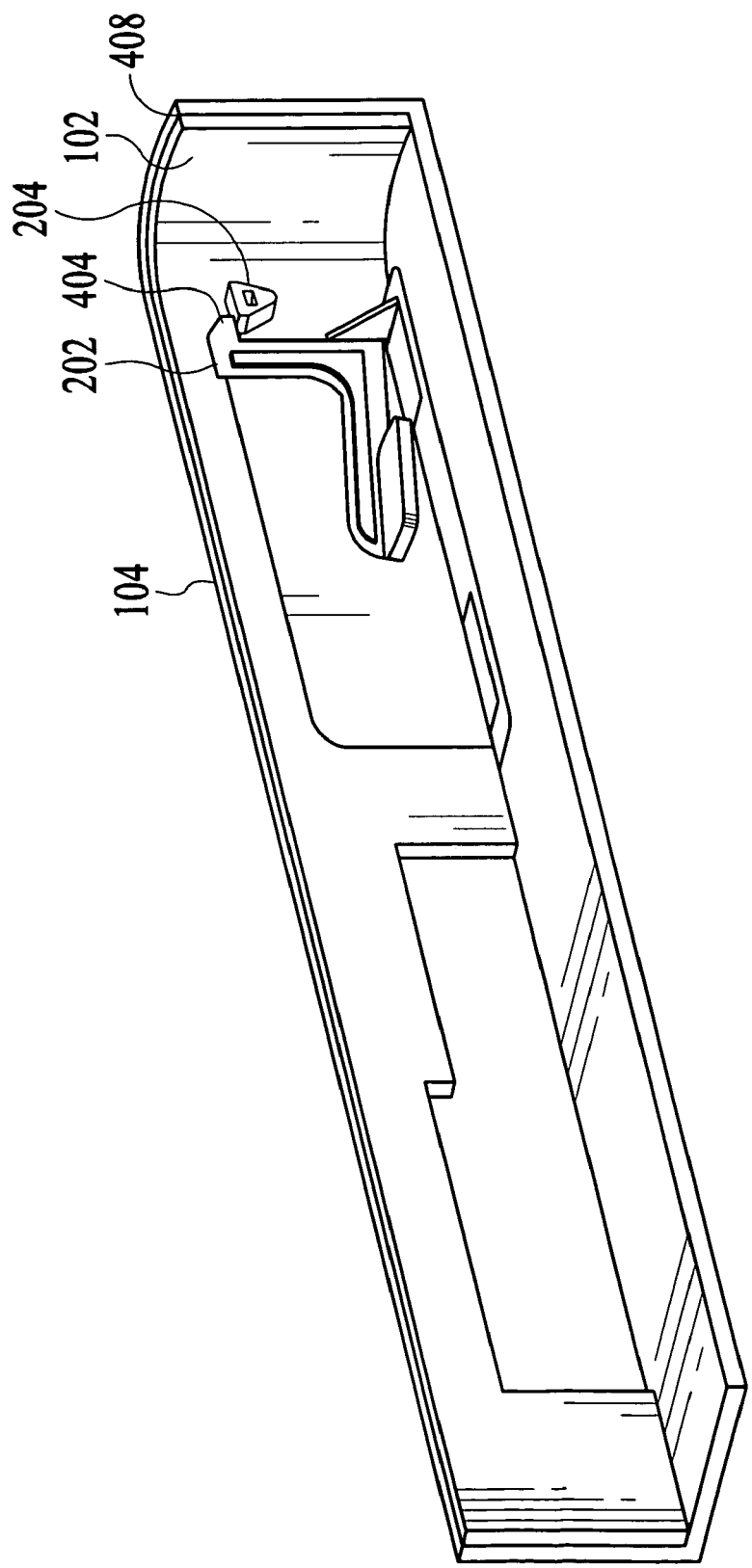
FIG. 6 is a cut-away perspective view of the computer 100 with the rear cover and the bezel engaged with each other.

FIG. 5 is a perspective view of the bezel 104. The latch 202 is coupled internal to the bezel 104. The body portion 402 is attached to the bezel preferably by an adhesive. FIG. 6 is a cut-away perspective view of the computer 100 with the rear cover and the bezel engaged with each other.

Figure 7:
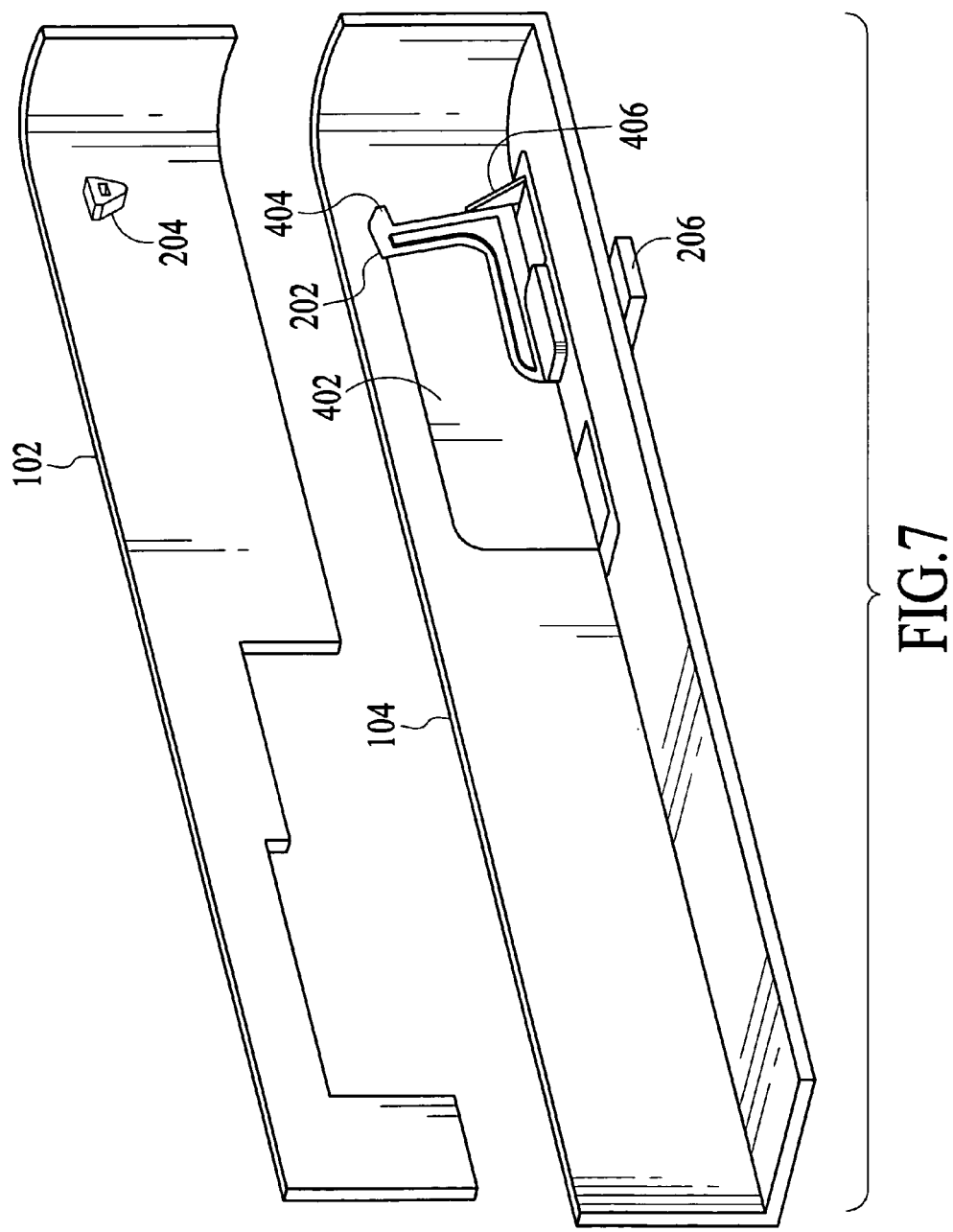
FIG. 7 is a perspective cut-away perspective view of the rear cover 104 and the bezel 102 with the bezel 102 disengaged from the rear cover 104.

FIG. 7 is a perspective cut-away perspective view of the rear cover 104 and the bezel 102 with the bezel 102 disengaged from the rear cover 104. As is seen rear cover 104 would fit between the body portion 402 and the latch portion of the latch 202 when the rear cover 104 is inserted into the bezel 102.

A latching system is provided for coupling together the members which house the interior components of a device. The latching system includes at least one latching mechanism which can be released through the use of a magnet exterior to the device thereby allowing for the decoupling of the members which house the interior components. In so doing, a tool such as a screwdriver or the like is not required to decouple the members.

Although the combination magnet and release latch mechanism in accordance with the present invention is shown with the preferred embodiment of a computer, one of ordinary skill in the art recognizes that such a release mechanism could also be used for other kinds of electronic or mechanical components which require an interior compartment to be accessed without the use of conventional tools such as a screwdriver or special key.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A latching mechanism adapted to couple together first and second exterior components that form at least a portion of an enclosure for a device, the latching mechanism comprising:
    a body portion adapted to be coupled to the second exterior component;
    a latch portion coupled to the body portion, the latch portion including a pivot point and first and second arms extending from the pivot point at an acute angle with respect to each other, wherein the latch portion is adapted to move between a latched position and an unlatched position;
    a hinge coupling the body portion to the latch portion about the pivot point, wherein the hinge is arranged to permit the latch portion to pivot with respect to the body portion;
    a protruding member adapted to be coupled to the first exterior component, wherein the first arm is adapted to engage the protruding member in the latched position and is adapted to disengage from the protruding member in the unlatched position; and
    a magnetically attractable material located at said second arm, wherein the latch portion is adapted to move from the latched position to the unlatched position when an external magnet is placed outside the device enclosure proximate to the magnetically attractable material.

2. The latching mechanism of claim 1, wherein the first arm includes a hook located at a distal end thereof, the hook being adapted to engage the protruding member.

3. The latching mechanism of claim 1, wherein the first exterior component is adapted to be removed from the device when the latching mechanism is disengaged.

4. The latching mechanism of claim 1, wherein the first exterior component comprises a rear cover and the second exterior component comprises a bezel.

5. The latching mechanism of claim 1, wherein the body portion includes a base adapted to be coupled to the second exterior component and a flange extending from the base, wherein the hinge and the latch portion are coupled to the flange.

6. The latching mechanism of claim 1, wherein the protruding member comprises a boss member.

7. A latching mechanism adapted to couple together first and second exterior components that form at least a portion of an enclosure for a device, the latching mechanism comprising:
    a body portion including a base adapted to be coupled to the second exterior component and a flange extending from the base;
    a latch portion coupled to the flange, the latch portion including a pivot point and first and second arms extending in different directions from the pivot point, wherein the latch portion is adapted to move between a latched position and an unlatched position;
    a hinge coupling the flange to the latch portion about the pivot point, wherein the hinge is arranged to permit the latch portion to pivot with respect to the flange;
    a protruding member adapted to be coupled to the first exterior component, wherein the first arm is adapted to engage the protruding member in the latched position and is adapted to disengage from the protruding member in the unlatched position; and a magnetically attractable material located at said second arm, wherein the latch portion is adapted to move from the latched position to the unlatched position when an external magnet is placed outside the device enclosure proximate to the magnetically attractable material, wherein the latch portion is spaced apart from the base of the body portion, and wherein the latch portion and the base are arranged to receive the first exterior component therebetween when the first and second exterior components are coupled together.

8. The latching mechanism of claim 7, wherein the base is adapted to be located between the first and second exterior components when the first and second exterior components are coupled together.

9. A latching system adapted to couple together first and second exterior components that couple together to form at least a portion of a device enclosure when the latching mechanism is engaged, the latching system comprising:

a plurality of latching mechanisms, each of the plurality of latching mechanisms including a body portion adapted to be coupled to the second exterior component;

a latch portion coupled to the body portion, the latch portion including a pivot point and first and second arms extending from the pivot point at an acute angle with respect to each other, wherein the latch portion is adapted to move between a latched position and an unlatched position;

a hinge coupling the body portion to the latch portion about the pivot point, wherein the hinge is arranged to permit the latch portion to pivot with respect to the body portion;

a protruding member adapted to be coupled to the first exterior component, wherein the first arm is adapted to engage the protruding member in the latched position and is adapted to disengage from the protruding member in the unlatched position; and a magnetically attractable material located at said second arm, wherein the latch portion is adapted to move from the latched position to the unlatched position when an external magnet is placed outside the device enclosure proximate to the magnetically attractable material.

10. The latching system of claim 9, wherein each of the first arms includes a hook located at a distal end thereof, the hook being adapted to engage its respective protruding member.

11. The latching system of claim 9, wherein the first exterior component is adapted to be removed from the device when each latching mechanism from the plurality of latching mechanisms is disengaged.

12. The latching system of claim 9, wherein the first exterior component comprises a rear cover and the second exterior component comprises a bezel.

13. The latching system of claim 9, wherein each the body portion includes a base adapted to be coupled to the second exterior component and a flange extending from the base, wherein its respective hinge and respective latch portion are coupled to the flange.

14. The latching system of claim 9, wherein each of the plurality of latching mechanisms are adapted to be released simultaneously or consecutively by one or more externally located magnets.

15. A latching system adapted to couple together first and second exterior components that couple together to form at least a portion of a device enclosure when the latching mechanism is engaged, the latching system comprising:

a plurality of latching mechanisms, each of the plurality of latching mechanisms including a body portion including a base adapted to be coupled to the second exterior component and a flange extending from the base;

a latch portion coupled to the flange, the latch portion including a pivot point and first and second arms extending in different directions from the pivot point, wherein the latch portion is adapted to move between a latched position and an unlatched position;

a hinge coupling the flange to the latch portion about the pivot point, wherein the hinge is arranged to permit the latch portion to pivot with respect to the flange;

a protruding member adapted to be coupled to the first exterior component, wherein the first arm is adapted to engage the protruding member in the latched position and is adapted to disengage from the protruding member in the unlatched position; and a magnetically attractable material located at said second arm, wherein the latch portion is adapted to move from the latched position to the unlatched position when an external magnet is placed outside the device enclosure proximate to the magnetically attractable material, wherein each latch portion is spaced apart from the base of its respective body portion, and wherein each latch portion and its respective base portion are arranged to receive the first exterior component therebetween when the first and second exterior components are coupled together.

16. A device, comprising:

a rear cover;

a bezel adapted to engage the rear cover to form at least a portion of an enclosure for an interior region of the device; and one or more latching mechanisms located within the interior region of the device, wherein each of the one or more latching mechanisms includes a body portion coupled to the bezel;

a latch portion coupled to the body portion, the latch portion including a pivot point and first and second arms extending from the pivot point at an acute angle with respect to each other, wherein the latch portion is adapted to move between a latched position and an unlatched position;

a hinge coupling the body portion to the latch portion about the pivot point, wherein the hinge is arranged to permit the latch portion to pivot with respect to the body portion;

a protruding member coupled to the rear cover, wherein the first arm engages the protruding member in the latched position and disengages from the protruding member in the unlatched position; and a magnetically attractable material located at said second arm, wherein the latch portion is adapted to move from the latched position to the unlatched positions when an external magnet is placed outside the device enclosure proximate to the magnetically attractable material.

17. The device of claim 16, wherein the device comprises a computer.

18. The device of claim 16, wherein each the first arm includes a hook located at a distal end thereof, the hook being adapted to engage its respective protruding member.

19. The device of claim 16, wherein the rear cover is adapted to be removed from the device when each of the one or more latching mechanisms is disengaged.

20. A device, comprising:
a rear cover;
a bezel adapted to engage the rear cover to form at least a portion of an enclosure for an interior region of the device; and
one or more latching mechanisms located within the interior region of the device, wherein each of the one or more latching mechanisms includes
a body portion coupled to the bezel,
a latch portion coupled to the body portion, the latch portion including a pivot point and first and second arms extending in different directions from the pivot point, wherein the latch portion is adapted to move between a latched position and an unlatched position,
a hinge coupling the body portion to the latch portion about the pivot point, wherein the hinge is arranged to permit the latch portion to pivot with respect to the body portion,
a protruding member coupled to the rear cover wherein the first arm engages the protruding member in the latched position and disengages from the protruding member in the unlatched position, and
a magnetically attractable material located at said second arm, wherein the latch portion is adapted to move from the latched position to the unlatched positions when an external magnet is placed outside the device enclosure proximate to the magnetically attractable material,
wherein each body portion includes a base coupled to the bezel and a flange extending from the base, wherein its respective hinge and respective latch portion are coupled to the flange, wherein the latch portion is spaced apart from the base of the body portion, wherein the bezel is located between the latch portion and the base, and wherein each base is located between the rear cover and the bezel when the device is assembled.

* * * * *

UNITED STATES PATENT AND TRADEMARK OFFICE
CERTIFICATE OF CORRECTION

PATENT NO. : 7,934,780 B2
APPLICATION NO. : 11/327753
DATED : May 3, 2011
INVENTOR(S) : Michael David McBroom et al.

It is certified that error appears in the above-identified patent and that said Letters Patent is hereby corrected as shown below:

In column 5, line 55, in claim 13, delete "each the" and insert -- each of the --, therefor.

In column 6, line 62, in claim 18, delete "each the" and insert -- each of the --, therefor.

Signed and Sealed this
Twenty-seventh Day of December, 2011

David J. Kappos
*Director of the United States Patent and Trademark Office*